(12) United States Patent
Chatterjee et al.

(10) Patent No.: US 12,028,096 B2
(45) Date of Patent: Jul. 2, 2024

(54) TRANSMITTER DEVICE SUPPORTING ANTENNA DIVERSITY

(71) Applicant: TEXAS INSTRUMENTS INCORPORATED, Dallas, TX (US)

(72) Inventors: Rohit Chatterjee, Bengaluru (IN); Debapriya Sahu, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/489,163

(22) Filed: Sep. 29, 2021

(65) Prior Publication Data

US 2023/0094295 A1    Mar. 30, 2023

(51) Int. Cl.
| | |
|---|---|
| *H04B 1/00* | (2006.01) |
| *H03C 7/02* | (2006.01) |
| *H04B 1/02* | (2006.01) |
| *H04B 1/04* | (2006.01) |
| *H04B 7/02* | (2018.01) |

(52) U.S. Cl.
CPC ......... *H04B 1/0064* (2013.01); *H04B 1/0475* (2013.01); *H04B 1/0483* (2013.01); *H04B 2001/0408* (2013.01)

(58) Field of Classification Search
None
See application file for complete search history.

(56) References Cited

U.S. PATENT DOCUMENTS

| | | | | |
|---|---|---|---|---|
| 4,057,758 A * | 11/1977 | Hattori | ................. | H04B 7/0822 375/267 |
| 7,142,829 B2 * | 11/2006 | Sung | .................... | H04B 7/0608 375/299 |
| 7,873,330 B2 * | 1/2011 | Tudosoiu | .................. | H03F 3/24 455/73 |
| 7,936,852 B2 * | 5/2011 | Lindenmeier | ........ | H04B 7/0814 455/297 |
| 8,369,906 B2 * | 2/2013 | Kasha | .................. | H04B 1/0458 455/100 |
| 8,818,309 B2 * | 8/2014 | Li | .......................... | H03J 5/244 455/340 |
| 10,461,799 B2 * | 10/2019 | Yeh | ......................... | H04B 1/48 |

\* cited by examiner

*Primary Examiner* — Pablo N Tran
(74) *Attorney, Agent, or Firm* — Mandy Barsilai Fernandez; Frank D. Cimino

(57) ABSTRACT

A transmitter comprises an antenna array demultiplexor having a first input for an output signal, a second input for a control signal, a first output coupled to a first output pin, and a second output coupled to a second output pin. The antenna array demultiplexor provides the output signal to the first or second output based on the control signal. The first and second output pins are coupled to first and second antennae, respectively. In some implementations, the transmitter includes a transformer and a capacitor coupled in parallel between the first and second output pins, and the antenna array demultiplexor comprises a first switch coupled between the first output pin and a first ground pin, and a second switch coupled between the second output pin and a second ground pin. The first switch receives a second control signal, and the second switch receives an inverse of the second control signal.

28 Claims, 3 Drawing Sheets

TRANSMITTER DEVICE SUPPORTING ANTENNA DIVERSITY

BACKGROUND

Antenna diversity can be used to improve the quality and reliability of radio communication, such as in systems without a clear line-of-sight signal path between the transmitter and receiver. The output signal is transmitted through two or more spatially separated antennas, such that the output signal arrives at the receiver through two different paths. The two received copies of the output signal can be compared to reconstruct the output signal with fewer errors than if reconstructing the output signal from a single copy. To alternate between the two or more spatially separated antennas, some systems include on-board switches that increase the area, cost, and complexity of the system. In addition, output pins from the device or integrated circuit are needed to provide control signals to the on-board switches, reducing the number of output pins available for other purposes or requirements.

SUMMARY

A transmitter device includes an antenna array demultiplexor and first and second output pins. The antenna array demultiplexor has a first input for an output signal, a second input for a control signal, a first output coupled to the first output pin, and a second output coupled to the second output pin. The antenna array demultiplexor provides the output signal to the first output or the second output based on the control signal. The first output pin is configured to be coupled to a first antenna, and the second output pin is configured to be coupled to a second antenna.

In some implementations, the control signal is a first control signal, and the transmitter device also includes a transformer and a capacitor, and the antenna array demultiplexor includes a first switch and a second switch. The transformer has a primary winding configured to receive a differential signal and a secondary winding configured to output the output signal. The secondary winding and the capacitor are coupled in parallel between the first and second output pins. In the antenna array demultiplexor, the first switch is coupled between the first output pin and a first ground pin, and the second switch is coupled between the second output pin and a second ground pin. The first switch is configured to receive a second control signal, and the second switch is configured to receive an inverse of the second control signal.

The capacitor is a first capacitor in some implementations, and the antenna array demultiplexor further includes a second capacitor coupled between the first switch and the first ground pin. A capacitance of the second capacitor is chosen to reduce signal leakage from an inductance of a wire bond coupling the first ground pin to a common mode voltage. Alternatively or in addition, the antenna array demultiplexor further includes a second capacitor coupled between the second switch and the second ground pin. A capacitance of the second capacitor is chosen to reduce signal leakage from an inductance of a wire bond coupling the second ground pin to the common mode voltage.

In some implementations, the first switch is a first transistor, and the second switch is a second transistor. The first transistor is coupled between the first output pin and the first ground pin, and has a gate terminal coupled to a first control node to receive the second control signal. The second transistor is coupled between the second output pin and the second ground pin, and has a gate terminal coupled to a second control node to receive the inverse of the second control signal. The capacitor is a first capacitor in some implementations, and the antenna array demultiplexor includes a second capacitor coupled between the gate terminal of the first transistor and the first output pin. The capacitance of the second capacitor is chosen based on a parasitic capacitance of the first transistor. Alternatively or in addition, the antenna array demultiplexor includes a second capacitor coupled between the gate terminal of the second transistor and the second output pin, and a capacitance of the second capacitor is chosen based on a parasitic capacitance of the second transistor.

In some implementations, the antenna array demultiplexor further comprises a first resistor, a second resistor, and an inverter. The first resistor is coupled between the gate terminal of the first transistor and the first control node. The inverter has an input and an output, and the input of the inverter is coupled to the first control node. The second resistor is coupled between the output of the inverter and the first ground pin.

In some implementations, the antenna array demultiplexor further comprises a first resistor, a second resistor, and an inverter. The first resistor is coupled between the gate terminal of the second transistor the second control node. The inverter has an input and an output, and the input of the inverter is coupled to the second control node. The second resistor is coupled between the output of the inverter and the second ground pin.

The transmitter device can be included in an apparatus that comprises a circuit board, a first antenna, and a second antenna. The transmitter device, the first antenna, and the second antenna are affixed to the circuit board. The first antenna is coupled to the first output pin, and the second antenna is coupled to the second output pin. The first and second antennas are spatially separated on the circuit board.

BRIEF DESCRIPTION OF THE DRAWINGS

For a detailed description of various examples, reference will now be made to the accompanying drawings in which.

DETAILED DESCRIPTION

The disclosed transmitter devices are configured to enable antenna diversity without on-board switches by including an integrated logic circuit. The logic circuit receives the output signal and a control signal, and provides the output signal to either a first output or a second output based on the control signal. The first output is coupled to a first output pin, which is further coupled to an on-board first antenna. The second output is coupled to a second output pin, which is further coupled to an on-board second antenna.

Figure 1:
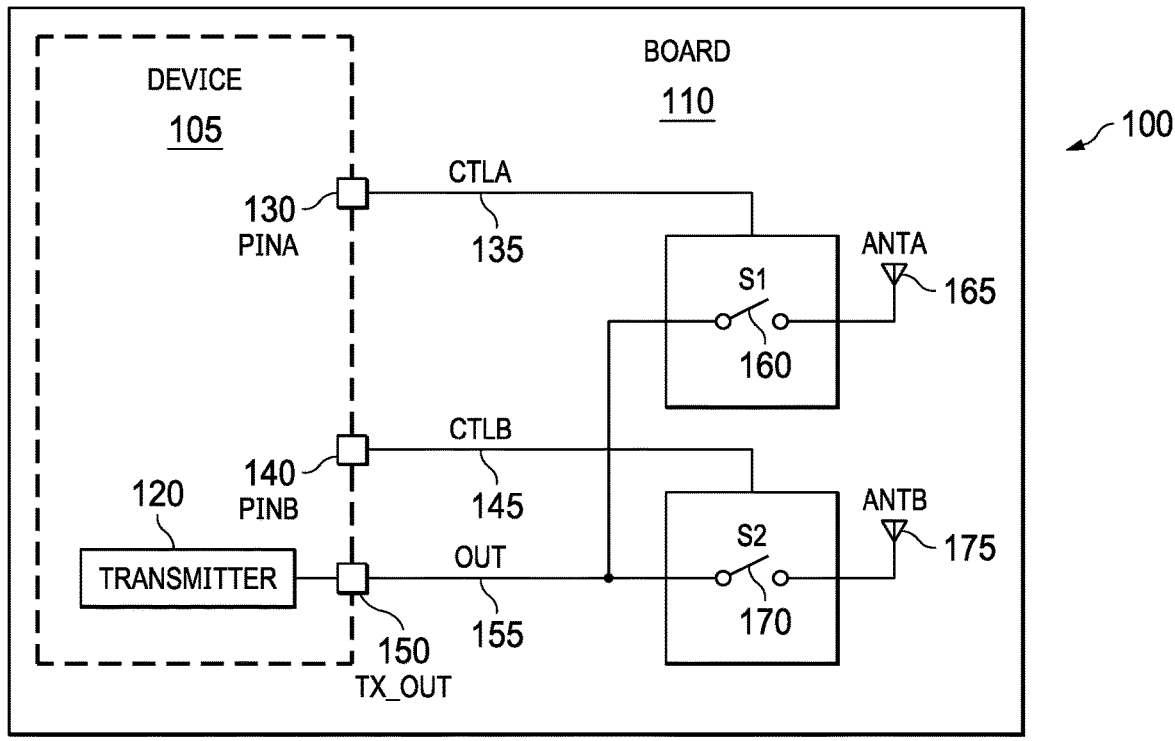
FIG. 1 shows a simplified block diagram of a transmitter with a two-antenna diversity scheme implemented by on-board switches.

FIG. 1 shows a simplified block diagram of a transmitter system 100 with a two-antenna diversity scheme implemented by on-board switches S1 160 and S2 170. The transmitter system 100 includes a transmitting (TX) device 105 affixed to an integrated circuit board 110, switches S1 and S2, and antennas ANTA 165 and ANTB 175. The TX device 105 may be physically implemented using any combination of discrete device(s), multi-function device(s), system-on-a-chip device(s), and/or other component(s) and, in some examples, is implement using a single, packaged circuit device such as a system-on-a-chip. The TX device 105 includes a transmitter 120 and three output pins: PINA 130, PINB 140, and TX_OUT 150. The transmitter 120 is coupled to the output pin TX_OUT 150. On the board 110, the switches S1 160 and S2 170 are coupled to the output pin TX_OUT 150 and receive the output signal OUT 155 to be transmitted. The switch S1 160 is further coupled to the antenna ANTA 165 and opens and closes based on a control signal CTLA 135 from the output pin PINA 130. The switch S2 170 is further coupled to the antenna ANTB 175 and opens and closes based on a control signal CTLB 145 from the output pin PINB 140.

In a two-antenna diversity scheme, the output signal OUT 155 is transmitted through the two spatially separated antennas ANTA 165 and ANTB 175, such that the output signal OUT 155 arrives at a receiver through two different paths. By comparing the two received signals from different paths, the receiver can reconstruct the output signal OUT 155 with fewer errors than if reconstructing the output signal OUT 155 from a single received signal. To switch from ANTA 165 to ANTB 175 and vice versa, the TX device 105 generates and outputs control signals CTLA 135 and CTLB 145 for the on-board switches S1 160 and S2 170 through PINA 130 and PINB 140. The transmitter system 100 uses three pins of TX device 105 and two on-board switches S1 160 and S2 170 to implement the antenna diversity scheme, which increases the cost and complexity of transmitter system 100.

Figure 2:
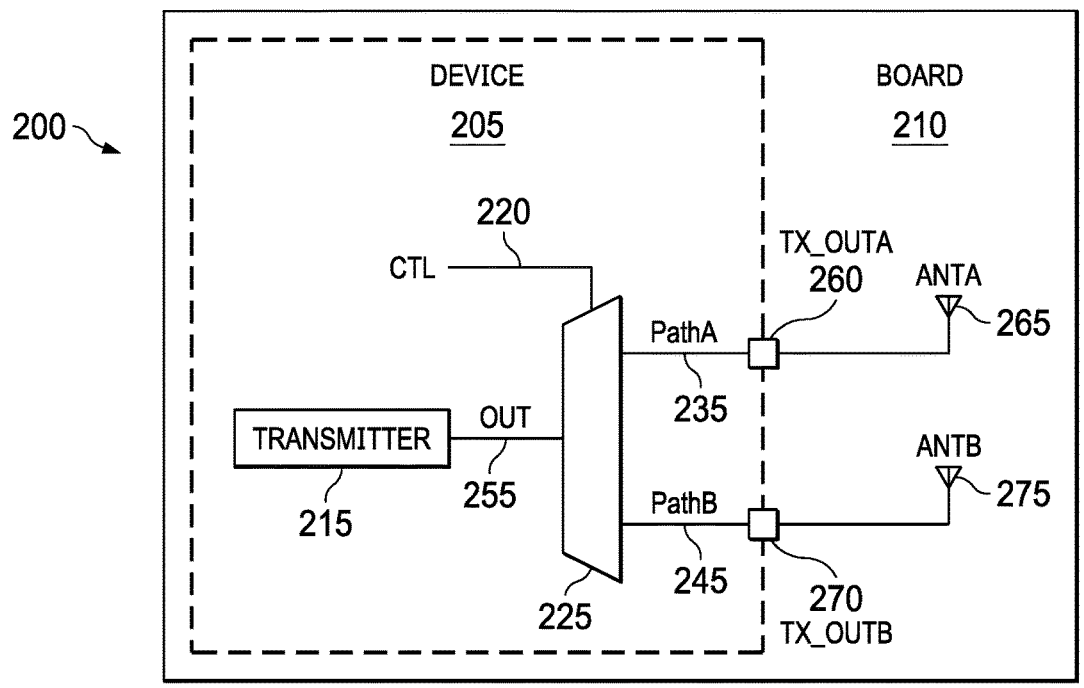
FIG. 2 shows a simplified block diagram of a transmitter with a two-antenna antenna diversity scheme implemented by an integrated logic circuit.

FIG. 2 shows a simplified block diagram of a transmitter system 200 with a two-antenna diversity scheme implemented by an integrated antenna array demultiplexor 225. The transmitter system 200 includes a TX device 205 affixed to an integrated circuit board 210 and antennas ANTA 265 and ANTB 275. The TX device 205 may be physically implemented using any combination of discrete device(s), multi-function device(s), system-on-a-chip device(s), and/or other component(s) and, in some examples, is implement using a single, packaged circuit device such as a system-on-a-chip. The TX device 205 includes the transmitter 215, the logic circuit 225, and two output pins TX_OUTA 260 and TX_OUTB 270. The antenna array demultiplexor 225 is shown as a demultiplexer in this implementation, but any appropriate logic circuit can be used. The antennas ANTA 265 and ANTB 275 on the circuit board 210 are coupled directly to the output pins TX_OUTA 260 and TX_OUTB 270, respectively.

The antenna array demultiplexor 225 receives the output signal OUT 255 from the transmitter 215 and a control signal CTL 220, which can be generated by a controller in the TX device 205 (not shown). The antenna array demultiplexor 225 then outputs OUT 255 through path A 235 to the output pin TX_OUTA 260 or through path B 245 to the output pin TX_OUTB 270 based on the control signal CTL 220. The switching scheme to enable the two-antenna diversity is integrated into the TX device 205, eliminating the need for on-board switches and reducing the cost and complexity of transmitter system 200. In addition, the switching scheme uses two output pins, one fewer than in transmitter system 100 shown in FIG. 1, which frees up one output pin for another use. Although transmitter system 200 includes two antennas, additional antennas may be used in other implementations.

Figure 3A:
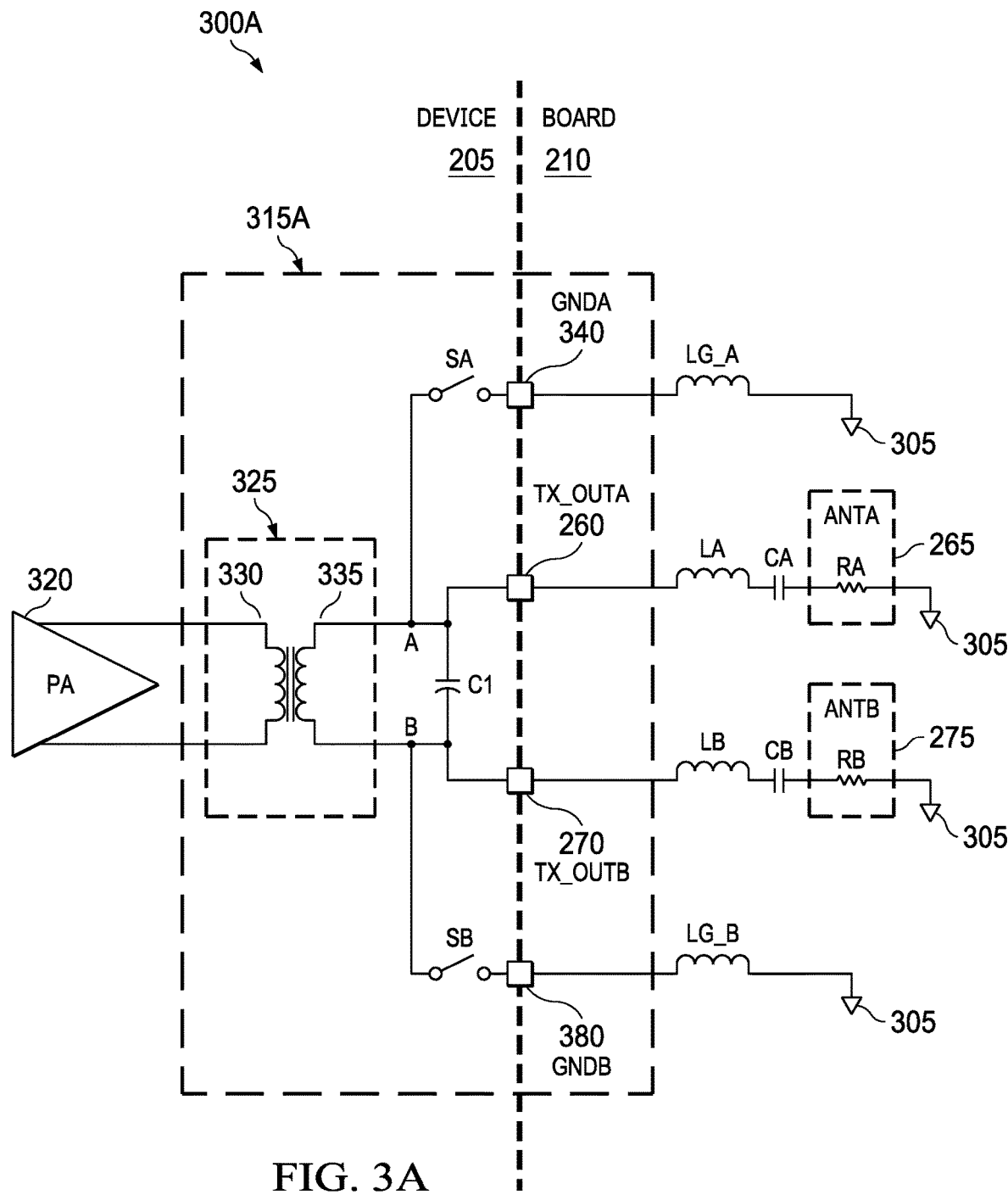
FIG. 3A shows a circuit diagram of the transmitter shown in FIG. 2.

FIG. 3A shows a diagram of a circuit 300A implementing the transmitter system 200 shown in FIG. 2. In circuit 300, the TX device 205 includes a power amplifier (PA) 320 of the signal chain that generates the output signal OUT 255, a transformer 325, a capacitor C1, and switches SA and SB. The transformer 325, the capacitor C1, and the switches SA and SB are included in the antenna array demultiplexor 315A, which is one example implementation of the antenna array demultiplexor 225 shown in FIG. 2. On the circuit board 210, the DC blocking capacitor CA is coupled to a resistor RA that represents the impedance of antenna ANTA 265, and the DC blocking capacitor CB is coupled to a resistor RB that represents the impedance of antenna ANTB 275. The inductors LG_A, LG_B, LA, and LB represent the inductances of bond wires on the circuit board 210. The transformer 325 can be a balun transformer in some implementations.

A first differential output of PA 320 is coupled to a first terminal of the primary winding 330 of transformer 325, and a second differential output of PA 320 is coupled to a second terminal of the primary winding 330. A first terminal of the secondary winding 335 of transformer 325 is to node A, and a second terminal of the secondary winding 335 is coupled to node B. The capacitance of C1 can be chosen based on the desired output power of OUT 255 to counter the package inductances LG_A, LG_B, LA, and LB, and the inductance of transformer 325. The switch SA is coupled to node A and to a first ground pin GNDA 340 of the TX device 205. The inductor LG_A represents the inductance of the ground bond wire coupling GNDA 340 to a common mode node 305 (e.g., a ground node or common ground plane). The output pad TX_OUTA 260 is coupled to node A, and the inductance of the signal bond wire from TX_OUTA 260 to ANTA 265 is represented by LA. The on-board DC blocking capacitor CA is coupled in series to the inductor LA and the antenna ANTA 265, which is further coupled to ground 305.

The switch SB is coupled to node B and to a second ground pad GNDB 380 of the TX device 205. The inductor LG_B represents the inductance of the ground bond wire coupling GNDB 380 to the ground 305. The output pin TX_OUTB 270 is coupled to node B, and the inductance of the signal bond wire from TX_OUTB 270 to ANTB 275 is represented by LB. The on-board DC blocking capacitor CB is coupled in series to the inductor LB and the antenna ANTB 275, which is further coupled to ground 305.

The antenna to be deactivated is shorted to ground 305 by the corresponding switch, while the other switch is left open. For example, ANTA 265 transmits OUT 255, and SA is open, disconnecting node A from ground 305. SB is closed, shorting node B to ground 305 and deactivating ANTB 275. Conversely, ANTB 275 transmits OUT 255, and SB is open, disconnecting node B from ground 305. SA is closed, shorting node A to ground 305 and deactivating ANTA 265. Coupling switches SA and SB in parallel to the primary signal paths to ANTA 265 and ANTB 275 instead of in series improves the efficiency of transmitter 200 and the linearity of OUT 255. In addition, the switches SA and SB occupy less area than a circuit including a unique PA 320 and transformer 325 for each of ANTA 265 and ANTB 275 would occupy.

Figure 3B:
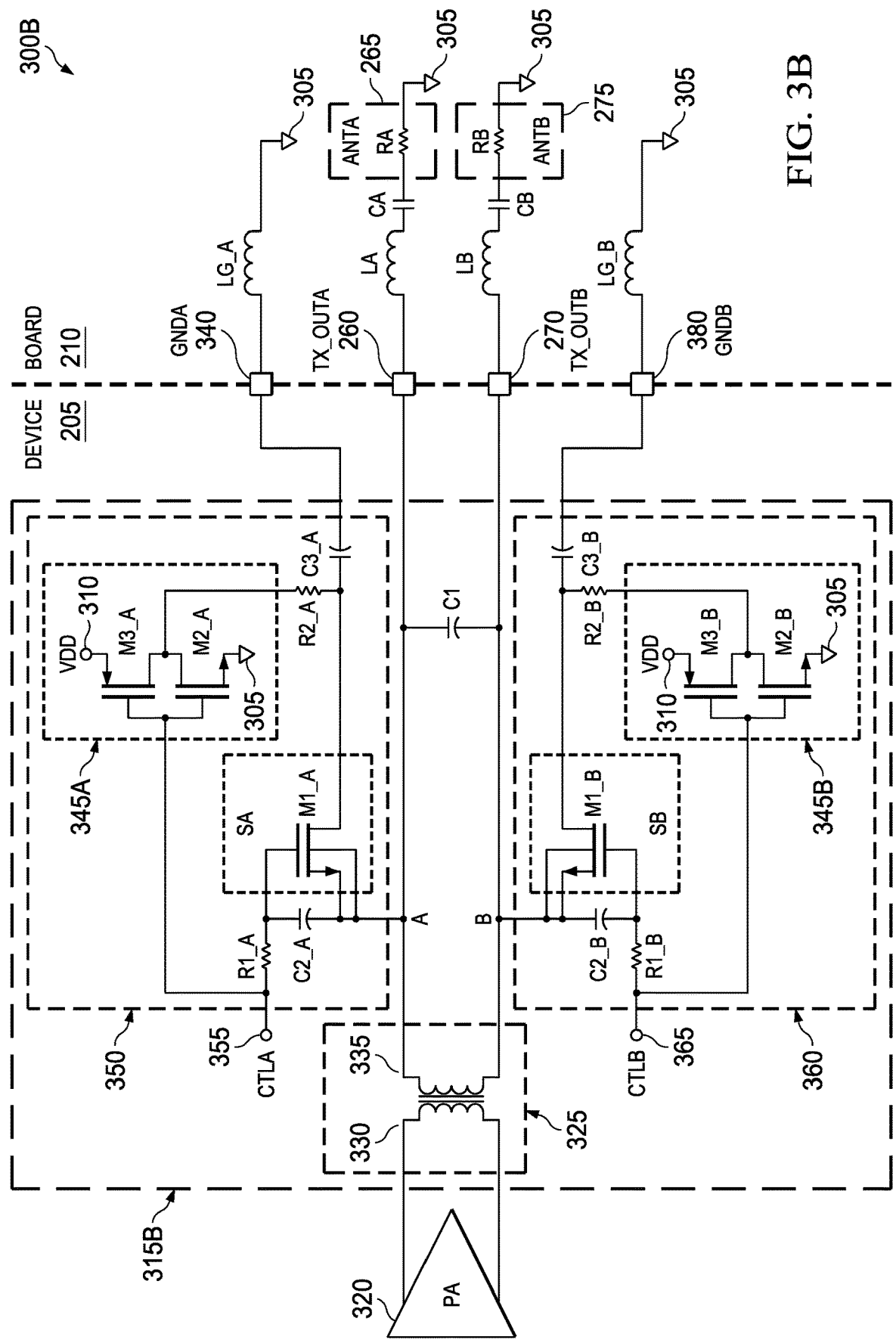
FIG. 3B shows a circuit diagram of the transmitter shown in FIG. 3A with low impedance shorting paths for the first and second antennas.

However, depending on the implementation, the inductances LG_A and LG_B of the ground bond wires can cause a portion of the signal to leak into the deactivated antenna. In addition, in many examples, the switches SA and SB should be biased such that the switches do not open or close in error due to high-voltage swings at nodes A and B, and the on-resistances (Rons) of switches SA and SB must not significantly affect balun loss. The circuit diagram 300B shown in FIG. 3B is similar to the circuit diagram 300A shown in FIG. 3A, and includes circuits 350 and 360 to compensate for LG_A and LG_B and bias the switches SA and SB. The transistors M1_A and M1_B act as switches SA and SB, respectively. Transistors M1_A and M1_B may be implemented using high voltage devices having high threshold voltages and able to withstand large voltage swings. The transistor sizes are chosen to reduce the impact of the Rons on balun loss without increasing parasitic capacitances above a desired threshold. The antenna array demultiplexor 315B is one example implementation of the antenna array demultiplexor 225 shown in FIG. 2 and includes the transformer 325, the capacitor C1, the transistors M1_A and M1_B, and the biasing circuits 350 and 360.

Circuit 350 includes transistors M1_A, M2_A, and M3_A; capacitors C2_A and C3_A; and resistors R1_A and R2_A. The source terminal of M1_A is coupled to node A, and the capacitor C2_A is coupled between node A and the gate terminal of M1_A. The capacitance of C2_A is chosen based on the gate-to-source parasitic capacitance of M1_A to maintain a constant gate-to-source voltage (Vgs) despite swings in voltage at node A. For example, the capacitance of C2_A can be five to ten times the gate-to-source parasitic capacitance of M1_A. The resistor R1_A is coupled between the gate terminal of M1_A and a node configured to receive the control signal CTLA 355. The control signal CTLA 355 indicates whether M1_A is to be turned on or turned off, and has a logic high approximately equal to the supply voltage (Vdd) of the PA 320, for example 2.7 volts (V), and a logic low approximately equal to zero V. CTLA 355 can be generated by the controller in TX device 205 based on the CTL 220. The drain terminal of M1_A is coupled to a first terminal of the resistor R2_A and a first terminal of the capacitor C3_A.

A second terminal of the resistor R2_A is coupled to an output of inverter 345A. The gate terminals of M2_A and M3_A are coupled together and to the node configured to receive CTLA 355. The source terminal of M2_A is coupled to ground 305, and the drain terminal of M2_A is coupled to the drain terminal of M3_A. The source terminal of M3_A is coupled to a supply voltage rail 310 configured to receive the supply voltage Vdd. M2_A and M3_A form an inverter 345A. While CTLA 355 is logic high, M3_A is turned off, and M2_A is turned on, coupling the output of inverter 345A and the second terminal of the resistor R2_A to ground 305.

While CTLA 355 is logic low, M2_A is turned off, and M3_A is turned on, coupling the output of inverter 345A and the second terminal of the resistor R2_A to the supply voltage rail Vdd 310. A second terminal of the capacitor C3_A is coupled to the first ground pin GNDA 340. The capacitance of C3_A is chosen to reduce signal leakage due to the wire bond inductance represented by LG_A while M1_A acts as a closed switch. That is, the capacitance of C3_A is chosen to tune out LG_A at the channel frequency for TX device 205 and provide a low impedance path to ground. The resistances of R1_A and R2_A may be chosen to help pull the gate and drain terminals of M1_A to Vdd 310 or ground 305 while reducing the impact of the resistances on the overall impedance. For example, R1_A and R2_A can be 20-200 kiloOhms (kΩ).

While CTLA 355 indicates M1_A should be turned on, inverter 345A couples the second terminal of R2_A to ground 305 to maintain a low voltage at the drain terminal of M1_A such that M1_A remains turned on despite any signal swing. While M1_A is on and because the Ron of M1_A is relatively low, the drain and source of M1_A are at approximately the same potential. In addition, the capacitor C2_A coupled between the source and gate terminals of M1_A ensures that any signal swing experienced at node A is coupled to the gate terminal of M1_A as well, keeping the Vgs constant despite signal swing and greater than the threshold voltage Vth of M1_A.

While CTLA 355 indicates M1_A should be turned off, inverter 345A couples the second terminal of R2_A to the supply voltage rail Vdd 310, maintaining the supply voltage Vdd 310 at the drain terminal of M1_A. The source terminal of M1_A is biased to approximately zero V because the source and drain terminals of M1_B are biased to approximately zero V and the source terminals of M1_A and M1_B are coupled together via the secondary winding 335. The capacitor C2_A couples any signal swing on node A to the gate terminal of M1_A. While the signal swing is less than the supply voltage Vdd 310, the Vgs of M1_A is approximately equal to zero V.

While the signal swing is greater than the supply voltage Vdd 310, the drain and source terminals of M1_A switch such that node A is the drain terminal, and the source terminal of M1_A is biased to the supply voltage Vdd 310. While the signal swing at node A is less than the sum of the supply voltage Vdd 310 and the Vth of M1_A, the Vgs of M1_A stays below Vth, and M1_A remains off. While the signal swing at node A is greater than the sum of the supply voltage Vdd 310 and the Vth of M1_A, the Vgs of M1_A increases above the Vth, and M1_A turns on weakly. Because it is only weakly turned on, M1_A continues to be high impedance, reducing the amount of signal leakage through M1_A to ground 305.

Circuit 360 includes transistors M1_B, M2_B, and M3_B; capacitors C2_B and C3_B; and resistors R1_B and R2_B. The source terminal of M1_B is coupled to node B, and the capacitor C2_B is coupled between node B and the gate terminal of M1_B. The capacitance of C2_B is chosen based on the gate-to-source parasitic capacitance of M1_B to maintain a constant Vgs despite swings in voltage at node B. For example, the capacitance of C2_B can be five to ten times the gate-to-source parasitic capacitance of M1_B. The resistor R1_B is coupled between the gate terminal of M1_B and a node configured to receive the control signal CTLB 365. The control signal CTLB 365 indicates whether M1_B is to be turned on or turned off, and has a logic high of approximately Vdd 310 and a logic low of approximately zero V. CTLB 365 can be generated by the controller in TX device 205 based on the CTL 220. The drain terminal of M1_B is coupled to a first terminal of the resistor R2_B and a first terminal of the capacitor C3_B.

A second terminal of the resistor R2_B is coupled to an output of inverter 3456. In inverter 3456, the gate terminals of M2_B and M3_B are coupled together and to the node configured to receive CTLB 365. The source terminal of M2_B is coupled to ground 305, and the drain terminal of M2_B is coupled to the drain terminal of M3_B. The source terminal of M3_B is coupled to a supply voltage rail 310 configured to receive the supply voltage Vdd. M2_B and M3_B form an inverter 3456. While CTLB 365 is logic high, M3_B is turned off, and M2_B is turned on, coupling the output of inverter 3456 and the second terminal of the resistor R2_B to ground 305.

While CTLB 365 is logic low, M2_B is turned off, and M3_B is turned on, coupling the output of inverter 3456 and the second terminal of the resistor R2_B to the supply voltage rail Vdd 310. A second terminal of the capacitor C3_B is coupled to the second ground pad GNDB 380. The capacitance of C3_B is chosen to reduce signal leakage due to the wire bond inductance represented by LG_B while M1_B acts as a closed switch. That is, the capacitance of C3_B is chosen to tune out LG_B at the channel frequency for TX device 205 and provide a low impedance path to ground. The resistances of R1_B and R2_B may be chosen to help pull the gate and drain terminals of M1_B to Vdd 310 or ground 305 while reducing the impact of the resistances on the overall impedance. For example, R1_B and R2_B can be 20-200 kΩ.

While CTLB 365 indicates M1_B should be turned on, inverter 345B couples the second terminal of R2_B to ground 305 to maintain a low voltage at the drain terminal of M1_B such that M1_B remains turned on despite any signal sing. While M1_B is on and because the Ron of M1_B is relatively low, the drain and source of M1_B are at approximately the same potential. In addition, the capacitor C2_B coupled between the source and gate terminals of M1_B ensures that any signal swing experienced at node B is coupled to the gate terminal of M1_B as well, keeping the Vgs constant despite signal swing and greater than the threshold voltage Vth of M1_B.

While CTLB 365 indicates M1_B should be turned off, inverter 345B couples the second terminal of R2_B to the supply voltage rail Vdd 310, maintaining the supply voltage Vdd 310 at the drain terminal of M1_B. The source terminal of M1_B is biased to approximately zero V because the source and drain terminals of M1_A are biased to approximately zero V and the source terminals of M1_A and M1_B are coupled together via the secondary winding 335. The capacitor C2_B couples any signal swing on node B to the gate terminal of M1_B. While the signal swing is less than the supply voltage Vdd 310, the Vgs of M1_B is approximately equal to zero V.

While the signal swing is greater than the supply voltage Vdd 310, the drain and source terminals of M1_B switch such that node B is the drain terminal, and the source terminal of M1_B is biased to the supply voltage Vdd 310. While the signal swing at node B is less than the sum of the supply voltage Vdd 310 and the Vth of M1_B, the Vgs of M1_B stays below Vth, and M1_B remains off. While the signal swing at node B is greater than the sum of the supply voltage Vdd 310 and the Vth of M1_B, the Vgs of M1_B increases above the Vth, and M1_B turns on weakly. Because it is only weakly turned on, M1_B continues to be high impedance, reducing the amount of signal leakage through M1_B to ground 305.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

The terms "pin" and "pad" are used interchangeably throughout.

Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A circuit device comprising:
   a first output terminal configured to be coupled to a first antenna;
   a first ground terminal;
   a first transistor having a current path coupled between the first output terminal and the first ground terminal, wherein the first transistor includes a control terminal coupled to a first control node that is configured to receive a first control signal;
   a second output terminal configured to be coupled to a second antenna;
   a second ground terminal; and
   a second transistor having a current path coupled between the second output terminal and the second ground terminal, wherein the second transistor includes a control terminal coupled to a second control node that is configured to receive a second control signal different from the first control signal.

2. The circuit device of claim 1, further comprising:
   a third transistor having a current path coupled between a voltage supply node and a first node, wherein the third transistor includes a control terminal coupled to the first control node, and wherein the first node is coupled to the first ground terminal; and
   a fourth transistor having a current path coupled between the first node and a reference node, wherein the fourth transistor includes a control terminal coupled to the first control node.

3. The circuit device of claim 2, further comprising:
   a first resistor coupled between the control terminal of the first transistor and the first control node; and a second resistor coupled between the first node and the first ground terminal.

4. The circuit device of claim 2, further comprising:
a first capacitor coupled between the control terminal of the first transistor and the first output terminal; and
a second capacitor coupled between the current path of the first transistor and the first ground terminal.

5. The circuit device of claim 2, further comprising:
a fifth transistor coupled between the voltage supply node and a second node, wherein the fifth transistor includes a control terminal coupled to the second control node, and wherein the second node is coupled to the second ground terminal; and
a sixth transistor coupled between the second node and the reference node, wherein the sixth transistor includes a control terminal coupled to the second control node.

6. The circuit device of claim 5, further comprising:
a first resistor coupled between the control terminal of the second transistor and the second control node; and
a second resistor coupled between the second node and the second ground terminal.

7. The circuit device of claim 5, further comprising:
a first capacitor coupled between the control terminal of the second transistor and the second output terminal; and
a second capacitor coupled between the current path of the second transistor and the second ground terminal.

8. The circuit device of claim 1, further comprising a transformer having a primary winding and a secondary winding, wherein:
a first terminal of the secondary winding is coupled to the first output terminal; and
a second terminal of the secondary winding is coupled to the second output terminal.

9. The circuit device of claim 8, further comprising an amplifier that includes a first differential output and a second differential output, wherein:
the first output terminal is coupled to the first differential output of the amplifier; and
the second output terminal is coupled to the second differential output of the amplifier;
a first terminal of the primary winding is coupled to the first differential output of the amplifier; and
a second terminal of the primary winding is coupled to the second differential output of the amplifier.

10. The circuit device of claim 8, wherein the transformer is a balun transformer.

11. The circuit device of claim 10, wherein the balun transformer, and the first and second transistors are integrated in a single, packaged circuit device that includes the first and second output terminals, and the first and second ground terminals.

12. The circuit device of claim 1, wherein a transmitter device comprises the circuit device, and wherein the circuit device further comprises an antenna array demultiplexer that comprises the first and second transistors.

13. The circuit device of claim 1, further comprising the first antenna coupled to the first output terminal, and the second antenna coupled to the second output terminal.

14. A transmitter device comprising:
an antenna array demultiplexor having:
a first output terminal configured to be coupled to a first antenna,
a second output terminal configured to be coupled to a second antenna, first and second ground terminals,
a capacitor coupled between the first output terminal and the second output terminal,
a transformer having a primary winding configured to receive a differential signal, and a secondary winding coupled between the first output terminal and the second output terminal,
a first switch coupled between the first output terminal and the first ground terminal, wherein the first switch is configured to receive a control signal; and
a second switch coupled between the second output terminal and the second ground terminal, wherein the second switch is configured to receive an inverse of the control signal, wherein the antenna array demultiplexor is configured to provide an output signal to the first output terminal or the second output terminal based on the control signal, and wherein the output signal is based on the differential signal.

15. The transmitter device of claim 14, wherein:
the capacitor is a first capacitor;
the antenna array demultiplexor further comprises a second capacitor coupled between the first switch and the first ground terminal; and
a capacitance of the second capacitor is chosen to reduce signal leakage from an inductance of a wire bond coupling the first ground terminal to a common mode voltage.

16. The transmitter device of claim 15, wherein:
the antenna array demultiplexor further comprises a third capacitor coupled between the second switch and the second ground terminal; and
a capacitance of the third capacitor is chosen to reduce signal leakage from an inductance of a wire bond coupling the second ground terminal to the common mode voltage.

17. The transmitter device of claim 14, wherein:
the first switch comprises a first transistor coupled between the first output terminal and the first ground terminal, wherein the first transistor includes a control terminal coupled to a first control node that is configured to receive the control signal; and
the second switch comprises a second transistor coupled between the second output terminal and the second ground terminal, wherein the second transistor includes a control terminal coupled to a second control node that is configured to receive the inverse of the control signal.

18. The transmitter device of claim 17, wherein:
the capacitor is a first capacitor;
the antenna array demultiplexor further comprises a second capacitor coupled between the control terminal of the first transistor and the first output terminal; and
a capacitance of the second capacitor is chosen based on a parasitic capacitance of the first transistor.

19. The transmitter device of claim 18, wherein:
the antenna array demultiplexor further comprises a third capacitor coupled between the control terminal of the second transistor and the second output terminal; and
a capacitance of the third capacitor is chosen based on a parasitic capacitance of the second transistor.

20. The transmitter device of claim 17, further comprising:
a first resistor coupled between the control terminal of the first transistor and the first control node;
an inverter having an input and an output, wherein the input of the inverter is coupled to the first control node; and
a second resistor coupled between the output of the inverter and the first ground terminal.

21. The transmitter device of claim 20, further comprising:
a third resistor coupled between the control terminal of the second transistor and the second control node;
a second inverter having an input and an output, wherein the input of the second inverter is coupled to the second control node; and
a fourth resistor coupled between the output of the inverter and the second ground terminal.

22. The transmitter device of claim 14, wherein an apparatus comprises the transmitter device, the apparatus further comprising:
a circuit board, wherein the transmitter device is affixed to the circuit board;
the first antenna affixed to the circuit board and coupled to the first output terminal; and
the second antenna affixed to the circuit board and coupled to the second output terminal, wherein the first and second antennas are spatially separated on the circuit board.

23. The transmitter device of claim 14, further comprising a differential amplifier configured to provide the differential signal to the primary winding.

24. An apparatus, comprising:
a circuit board;
a first antenna affixed to the circuit board;
a second antenna affixed to the circuit board; and
a transmitter device affixed to the circuit board and comprising:
an antenna array demultiplexor comprising:
a first output terminal coupled to the first antenna,
a second output terminal coupled to the second antenna, first and second ground terminals,
a capacitor coupled between the first output terminal and the second output terminal,
a transformer having a primary winding configured to receive a differential signal, and a secondary winding coupled between the first output terminal and the second output terminal,
a first switch coupled between the first output terminal and the first ground terminal, wherein the first switch is configured to receive a control signal; and
a second switch coupled between the second output terminal and the second ground terminal, wherein the second switch is configured to receive an inverse of the control signal, wherein the antenna array demultiplexor is configured to provide an output signal to the first output terminal or the second output terminal based on the control signal, and wherein the output signal is based on the differential signal.

25. The apparatus of claim 24, wherein:
the capacitor is a first capacitor; and
the antenna array demultiplexor further comprises:
a second capacitor coupled between the first switch and the first ground terminal; and
a third capacitor coupled between the second switch and the second ground terminal.

26. The apparatus of claim 24, wherein:
the first switch comprises a first transistor coupled between the first output terminal and the first ground terminal, the first transistor having a control terminal coupled to a first control node that is configured to receive the control signal; and
the second switch comprises a second transistor coupled between the second output terminal and the second ground terminal, the second transistor having a control terminal coupled to a second control node that is configured to receive the inverse of the control signal.

27. The apparatus of claim 26, wherein:
the capacitor is a first capacitor; and
the antenna array demultiplexor further comprises:
a second capacitor coupled between the control terminal of the first transistor and the first output terminal; and
a third capacitor coupled between the control terminal of the second transistor and the second output terminal.

28. The apparatus of claim 26, further comprising:
a first resistor coupled between the control terminal of the first transistor and the first control node;
a first inverter having an input and an output, wherein the input of the first inverter is coupled to the first control node;
a second resistor coupled between the output of the first inverter and the first ground terminal;
a third resistor coupled between the control terminal of the second transistor and the second control node;
a second inverter having an input and an output, wherein the input of the second inverter is coupled to the second control node; and
a fourth resistor coupled between the output of the second inverter and the second ground terminal.

* * * * *